United States Patent
Singh et al.

(10) Patent No.: US 11,370,539 B2
(45) Date of Patent: Jun. 28, 2022

(54) SYSTEMS, METHODS, AND DEVICES FOR UNMANNED AERIAL VEHICLE RECOVERY

(71) Applicant: Ford Global Technologies, LLC, Dearborn, MI (US)

(72) Inventors: Aditya Singh, Redwood City, CA (US); James Carthew, Oakland, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 212 days.

(21) Appl. No.: 16/247,283

(22) Filed: Jan. 14, 2019

(65) Prior Publication Data
US 2020/0223543 A1 Jul. 16, 2020

(51) Int. Cl.
*B64C 39/02* (2006.01)
*H04B 7/185* (2006.01)

(52) U.S. Cl.
CPC .......... *B64C 39/024* (2013.01); *B64C 39/022* (2013.01); *H04B 7/18506* (2013.01); *B64C 2201/08* (2013.01); *B64C 2201/146* (2013.01)

(58) Field of Classification Search
CPC . B64C 39/024; B64C 39/022; B64C 2201/08; B64C 2201/146; H04B 7/18506
See application file for complete search history.

(56) References Cited

U.S. PATENT DOCUMENTS

| | | | | |
|---|---|---|---|---|
| 8,434,920 B2* | 5/2013 | Jones | ....... | F42B 12/42 362/470 |
| 9,132,916 B2 | 9/2015 | Hanna et al. | | |
| 10,011,352 B1* | 7/2018 | Dahlstrom | ....... | B05B 12/08 |
| 10,479,500 B2* | 11/2019 | Claridge | ....... | G05D 1/106 |
| 2012/0080556 A1* | 4/2012 | Root, Jr. | ....... | B64F 1/06 244/63 |
| 2017/0088261 A1* | 3/2017 | Sequeira | ....... | G01S 13/0209 |
| 2018/0074518 A1* | 3/2018 | Cantrell | ....... | G05D 1/102 |
| 2019/0256210 A1* | 8/2019 | Prager | ....... | B64D 1/22 |

FOREIGN PATENT DOCUMENTS

| | | |
|---|---|---|
| CN | 106103275 A | 11/2016 |
| FR | 3017109 A1 | 8/2015 |
| RU | 2574673 C1 | 2/2016 |
| WO | WO-2014080387 A2 * 5/2014 | .......... B64C 39/024 |
| WO | 2017/212125 A1 | 12/2017 |

OTHER PUBLICATIONS

Voltage Visuals. "Drone Rescue With Hook." Online video clip. You tube. YouTube, Jun. 20, 2017 (2 pages).

* cited by examiner

*Primary Examiner* — Thomas Ingram
*Assistant Examiner* — Omar K Morsy
(74) *Attorney, Agent, or Firm* — Brandon Hicks; Eversheds Sutherland (US) LLP

(57) ABSTRACT

Described herein are systems, methods, and devices for recovering unmanned aerial vehicles (UAVs), such as UAVs that are trapped in an obstacle such as a tree. In particular, a method is described, the method including determining location parameters associated with a trapped UAV; navigating to the proximity of the UAV; determining launching parameters and a target associated with the launch of a launching device; and causing the launch of a launching device towards the target. The launching device may include a tether, such that a user may pull on the tether to dislodge the trapped UAV from the tree.

20 Claims, 10 Drawing Sheets

US 11,370,539 B2

SYSTEMS, METHODS, AND DEVICES FOR UNMANNED AERIAL VEHICLE RECOVERY

FIELD

The disclosure relates generally to unmanned aerial vehicles (UAVs) or drones and more particularly relates to systems, methods, and devices for UAV recovery.

BACKGROUND

UAVs getting stuck in trees is one of the most common ways that operators lose their drones. There currently is not an effective and accurate way to address this problem, especially when the height at which the drone is stuck is more than 20 to 30 feet. A sophisticated grasping device (such as a robotic arm) can retrieve a randomly placed object but the contribution of the motion of such a device to the flight dynamics of the UAV must be accounted for and can be problematic. A less kinematic grasping device (such as robotic pinchers) will have less kinematic impact on a UAV's flight but will be more dependent upon the positioning capabilities of the UAV in flight.

DETAILED DESCRIPTION

Figure 1:
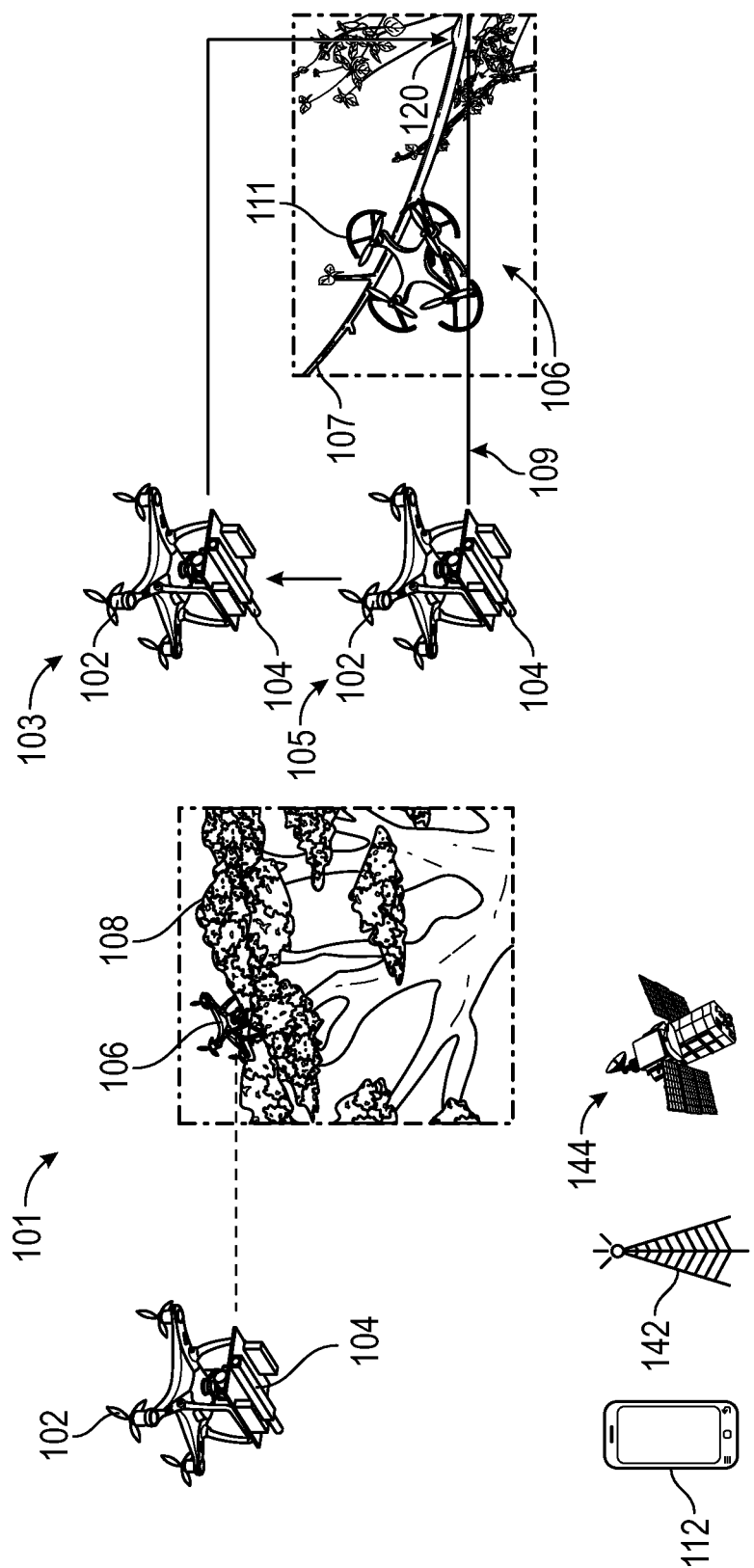
FIG. 1 shows diagrams of an environmental context for UAV retrieval systems, methods, and apparatuses, in accordance with example embodiments of the disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In some embodiments, unmanned aerial vehicles (UAVs) (also referred to as drones herein) may be used in a growing body of applications, including faster and cheaper package delivery. In various embodiments, UAVs may provide a platform for mobile commerce. For example, UAVs may serve as couriers for packages, and such UAVs may require users (e.g., customers) to pre-order various items, prepay for the items, and await the item's arrival via the UAV.

In various aspects, UAVs may, during the course of their operation, be placed in environments and locations that may make it difficult to retrieve the UAVs. Moreover, retrieving a UAV that is placed in a difficult-to-reach location may be a challenging procedure. For example, UAVs may get stuck in trees during the course of operation, which may represent one way that UAV operators lose their drones. Accordingly, embodiments of the disclosure provide effective and accurate ways to retrieve UAVs from remote or inconvenient locations. In particular, embodiments of the disclosure may serve to retrieve a UAV when the height at which the UAV is stuck is greater than about 20 to about 30 feet. Accordingly, various embodiments of the disclosure may have the advantage of saving UAV operators time and equipment in retrieving drones.

In various embodiments, a second UAV (referred to herein as a retrieval or rescue UAV) may include a remote launching unit (RLU), the RLU mechanically coupled to a portion of the second UAV and configured to launch a projectile (e.g., a grapple or similar device, also referred to herein as a launching device, a payload, a grasping device, a projectile component, and/or an actuator) at the location of the trapped UAV in order to free the trapped UAV. In one embodiment, in configurations in which the retrieval UAV is not in rigid contact with the projectile once the projectile is deployed (e.g., the RLU is connected with the projectile using a tether), there may not be significant dynamic movements (e.g., vibrations, rotations, etc.) of the UAV that require specialized control (e.g., stabilization control after a projectile is launched).

In one embodiment, a grasping device (e.g., a grapple and/or a robotic arm) is described (e.g., see FIG. 8 and related description) and may be used to retrieve a UAV or other object. In another embodiment, the contribution of the motion of the grasping device to the flight dynamics of the UAV may need to be accounted for and corrected in order to get stable performance and operation. For example, certain grasping devices (such as robotic pinchers) may have a lesser kinematic impact on the UAV's flight but may, on the other hand, be more dependent upon the positioning of the grasping device and the positioning and capabilities of the UAV in flight.

In another embodiment, one or more structural components of the RLU and/or the projectile may be three-dimensionally printed using predetermined materials (e.g., poly(lactic acid) (PLA)) with a relatively low density infill to reduce the weight of the projectile. In various aspects, the projectile component that is launched by the RLU may be a modular component, that may include different parts (to be described) to optimize trajectory and aerodynamics and/or to contribute to the retrieval of the projectile. For example, the projectile may include a collapsible grappling hook that may be collapsed upon a tether tugging the projectile to allow for easy removal from a tree having potentially blocking branches and the like. Moreover, the projectile component may include other devices that may be attached to the projectile such as active beacons, assisted landing anchors, and/or smaller fixed wing UAVs to aid in the retrieval of the projectile or the trapped UAV.

FIG. 1 shows diagrams of an environmental context for UAV retrieval systems, methods, and apparatuses, in accordance with example embodiments of the disclosure. In one embodiment, FIG. 1 shows a first diagram 101 of an example scenario where a UAV may be trapped or constrained in an object (e.g., a tree). In various aspects, as described at least partially with respect to FIG. 1, embodiments of the disclosure are directed to systems, methods, and apparatuses for retrieving one or more UAVs that are lodged and/or trapped in an obstacle such as in the branches of a tree. Moreover, a combination of a UAV and a retrieval mechanism comprising a tethered low mass projectile (such as a grappling hook) is described, to assist in the retrieval of UAVs that are trapped, for example, by the branches of a tree and at a relatively high altitude.

In one aspect, a trapped UAV 106 (also referred to as a constrained UAV herein) may be trapped in an area having rules prohibiting climbing trees (e.g., for safety reasons). Accordingly, a retrieval UAV 102 (also referred to as a rescue UAV herein) having a camera 104 feed with a launching mechanism (e.g., for projectile launch) may be used to locate and recover the trapped UAV 106; however, such a strategy comes with some potential pitfalls. For example, the branches of the tree 108 and other features (e.g., pinecones, fruits, etc.) may obstruct the view and/or reach of the devices associated with the rescue UAV 102. Further, access to the branches of the tree 108 may be limited thereby reducing the ability of the rescue UAV 102 to land in a proximate area to the trapped UAV 106. In various embodiments, a retrieval mechanism (e.g., a projectile to be shown and described below) may be used by the rescue UAV 102 and may need to be deployable from at least a predetermined distance (e.g., about 1 meter to 5 meters) from the trapped UAV 106. In another embodiment, the retrieval mechanism may need to be deployed without significantly impacting the flight dynamics and the aerodynamic stability of the rescue UAV 102.

In various embodiments, FIG. 1 shows a second diagram 103 of an example scenario where the retrieval UAV 102 is used to retrieve the trapped UAV 106. Diagram 103 shows various branches 107 of the tree 108 that may be obscuring the trapped UAV 106 and making it more difficult for the trapped UAV 106 to free itself from the tree 108. For example, the trapped UAV 106 may have a component 111 (e.g., a lifting fan) that is stuck in the branches 107 of the tree 108.

In particular, as shown in diagram 105, the retrieval UAV 102 may be initially used to locate the trapped UAV 106, for example, by traveling to the approximate location of the trapped UAV 106. Further, the retrieval UAV 102 may use one or more cameras 104 of the retrieval UAV 102 to allow a user (not shown) to identify the trapped UAV 106 or else use an artificial intelligence (AI)-based algorithm to automatically detect the trapped UAV 106, for example, using machine-vision algorithms executed by at least one processor running computer-executable instructions on a dedicated portion of the retrieval UAV 102. Once located, the user may determine a target location 120 (e.g., a portion of the tree 108 or a branch 107 of the tree 108) at which the user plans to launch a retrieval mechanism (e.g., the grappling hook) via the RLU which may be mounted on the retrieval UAV 102. In one embodiment, the target location 120 may include a portion of a branch 107 on which a component 111 of the trapped UAV 106 is constrained, or may be the trapped UAV 106 itself. In another embodiment, a laser pointer 109 may be configured to operate in connection with the retrieval UAV 102, and may serve to assist the user and/or AI-based algorithms used by the UAV to estimate various launch parameters (e.g., a vertical and/or horizontal distance between the retrieval UAV 102 and the target location 120, and an orientation of the retrieval UAV 102 with respect to the target location 120, and the like).

In various embodiments, the UAVs 102, 106, and other UAVs (not shown), and a user device 112 and other user devices (not shown), may be connected over any suitable network. For example, the user device 112 may include an app that is configured to communicate with the retrieval UAV 102 and/or the trapped UAV 106, as will be described further below. In various embodiments, the network may include wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Zigbee, Bluetooth protocols, wireless universal serial bus (USB) protocols, and/or any other wireless protocol.

In various embodiments, one or more satellites similar to satellite 144 and/or one or more cell towers similar to cell tower 142 may be used to locate the user device 112 and the UAVs 102 and/or 106.

In another embodiment, the UAVs 102 and/or 106 and the user device 112 may include a transceiver, which may in turn may include one or more location receivers (e.g., GPS receivers) that may receive location signals (e.g., GPS signals) from one or more satellites 144. In another embodiment, a GPS receiver may refer to a device that can receive information from GPS satellites and calculate the geographical position of one or more of the UAVs 102 and/or 106 and the user device 112 using suitable software.

The user devices 112 may be configured to communicate the one or more devices of the UAVs 102 and/or 106 using one or more communications networks, wirelessly or wired. Any of the communications networks may include, but are not limited to, any one of a combination of different types of suitable communications networks such as, for example, broadcasting networks, public networks (for example, the Internet), private networks, wireless networks, cellular networks, or any other suitable private and/or public networks. Further, any of the communications networks may have any suitable communication range associated therewith and may include, for example, global networks (for example, the Internet), metropolitan area networks (MANs), wide area networks (WANs), local area networks (LANs), or personal area networks (PANs). In addition, any of the communications networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The user device 112 and/or the UAVs 102 and/or 106 may include one or more communications antennas. A communications antenna may be any suitable type of antenna corresponding to the communications protocols used by the user device 112 and the devices of the UAVs 102 and/or 106. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 112 and/or the UAVs 102 and/or 106.

The user device 112 may include any suitable radio and/or transceiver for transmitting and/or receiving radio frequency (RF) signals in the bandwidth and/or channels corresponding to the communications protocols utilized by any of the user device 112 and/or the UAVs 102 and/or 106 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n), 5 GHz channels (e.g., 802.11n, 802.11ac), or 60 GHz channels (e.g., 802.11ad). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and a digital baseband.

Figure 2:
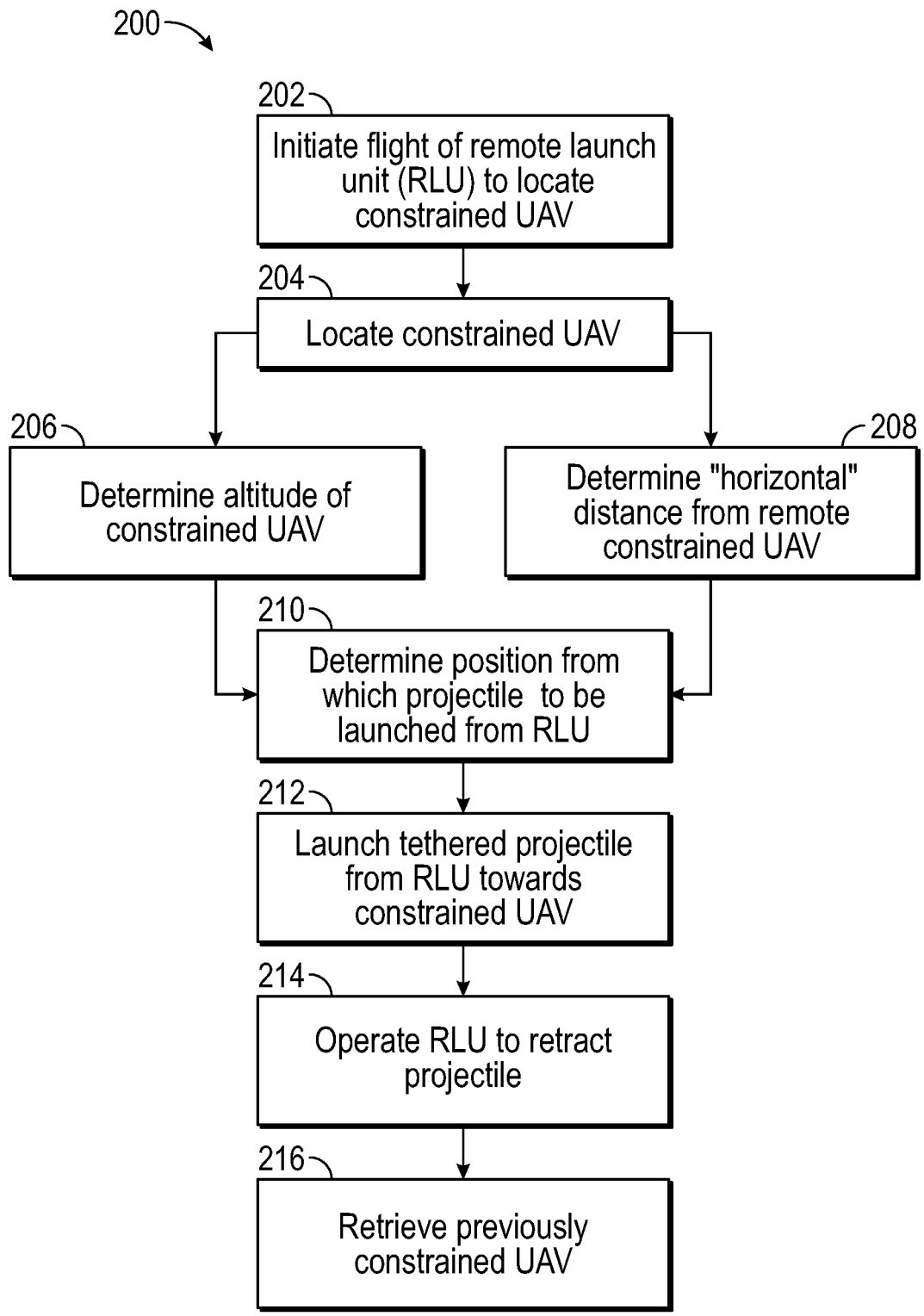
FIG. 2 shows an example flow diagram for UAV retrieval, in accordance with example embodiments of the disclosure.

FIG. 2 shows an example flow diagram for UAV retrieval, in accordance with example embodiments of the disclosure. At block 202, a retrieval UAV may have an RLU, and the retrieval UAV may be initiated to locate a constrained UAV. In particular, the retrieval UAV may be located in a suitable facility (e.g., a warehouse) that is specialized specifically for the maintenance of such retrieval UAVs. Further, the retrieval UAVs may have specific marking (e.g., logos, lights such as light-emitting diodes, fluorescent colors, beacons, etc.) that serve to identify the retrieval UAVs and distinguish them from other UAVs, for example, for regulatory compliance purposes.

In another embodiment, a user device (e.g., a mobile phone or a tablet) may be configured to launch an app that can summon the retrieval UAV. In various embodiments, the app may require various authentication information so that only authorized personnel (e.g., the maintenance staff associated with a given area) are able to summon the retrieval UAVs. In another embodiment, the app may be configured to allow the user device to be in communication with the trapped drone, and to receive information and send information to the trapped drone. In another embodiment, the app may be configured to send the coordinates (e.g., global positioning system (GPS) coordinates) of the user and/or the trapped UAV to the retrieval UAV.

At block 204, the constrained UAV may be located (e.g., by the retrieval UAV). In another embodiment, the retrieval UAV may be configured to travel to the approximate location of the coordinates provided by the app as described above. However, the coordinates may not be precise enough to determine the exact location of the trapped UAV, in which case the user may control the position of the retrieval UAV manually, for example, using a controller that may be dropped off by the retrieval UAV at the user's location, or via the app installed on the user's device. In another embodiment, the retrieval UAV may be configured to determine the exact location of the trapped UAV using the coordinates provided by the trapped UAV including an altitude information provided by the trapped UAV.

In another embodiment, the retrieval UAV's camera may be used to provide one or more images and videos of the laser pointer mark on the target. Moreover, the retrieval UAV camera and/or laser pointer mark may be used to determine the altitude at which the retrieval mechanism (e.g., the grappling hook) may need to be launched in order to coincide with the target location.

At block 206, the altitude of the constrained UAV may be determined. In various embodiments, the altitude of the constrained UAV may be determined using one or more onboard sensors of either the retrieval UAV or the constrained UAV. For example, the constrained UAV may include an altimeter that may be configured to record the real-time altitude of the constrained UAV, and this information may be wirelessly transmitted to the retrieval UAV over a wireless network (e.g., Bluetooth, Wi-Fi, cellular, etc.). In another embodiment, the retrieval UAV may have a range finder (e.g., laser, ultrasound sensor, etc.) that may be used to determine the altitude of the constrained UAV using any suitable technique.

At block 208, the horizontal distance from the remote constrained UAV may be determined. In another embodiment, the horizontal distance from the target may be estimated by an ultrasonic sensor on the retrieval UAV. In another embodiment, the ultrasonic sensor may be configured to transmit a pulse of ultrasonic energy at the constrained UAV and may detect a reflected signal from the constrained UAV. The timing of the reflected signal from the constrained UAV may correspond to the horizontal distance of the constrained UAV from the retrieval UAV. In another embodiment, a similar process may be used to determine a vertical distance of the constrained UAV from the retrieval UAV.

At block 210, the position from which to launch a projectile from the RLU of the retrieval UAV may be determined. In one embodiment, an algorithm may be executed by one or more processors of the retrieval UAV that determines the elevation and the direction that the retrieval mechanism (e.g., the grappling hook) may need to be launched in order for it to reach the target location. In another embodiment, the algorithm may take into account that once launched, the projectile will not only travel horizontally, but also will be influenced by gravity, causing a curved path of the projectile. In some embodiments, the algorithm may incorporate various environmental influences such as wind and/or rain in the algorithm's calculation of the projectile's trajectory and optimal positioning of the RLU.

At block 212, a tethered projectile may be launched from the RLU of the retrieval UAV towards the constrained UAV. In some embodiments, the projectile may include a projectile mount component (to be shown and described in connection with FIG. 8, below). Moreover, the retrieval mechanism (e.g., the grappling hook) can be tethered to the retrieval UAV, or a different UAV in communication with the retrieval UAV (e.g., a dedicated UAV that carries and launches the projectile). Moreover, the retrieval mechanism may include a tether (e.g., a cable, a rope, or a similar mechanism). Moreover, the tether may be deployed to a user, such that one end of the tether may be held by the hand of the user, as described below, to allow for the retrieval of objects captured by the projectile mount component.

At block 214, the RLU of the retrieval UAV may be operated to retract the projectile. As noted, in various embodiments, the retrieval UAV may be configured to fly to a determined elevation and get into a particular orientation with respect to the trapped UAV, and then launch the retrieval mechanism (e.g., the grappling hook), which may become caught up in the branches and foliage of the tree. Accordingly, by retracting the projectile after launch, the retrieval UAV may serve to cause the trapped UAV to become unconstrained. For example, the tether to which the grappling hook is attached may be tugged, the branches and foliage can be moved, freeing the trapped UAV such that it is either able to fly, or fall, out of the tree. In another embodiment, the "tugging" can be provided manually by the user, by the retrieval UAV or by a different UAV, so that the process may be fully automated.

At block 216, the previously constrained UAV may be retrieved. If a first attempt to dislodge the stuck UAV is not successful, subsequent attempts can be made. In various embodiments, various aspects of the disclosure may be directed to retrieving a trapped UAV in a tall tree (for example, as shown and described in connection with FIG. 2). However, various embodiments may also be applied to the retrieval of other objects which may become lodged in trees, for example, kites, balls, and the like.

As noted, embodiments of devices and systems (and their various components) described herein can employ AI to facilitate automating one or more features described herein (e.g., performing object recognition, determining launching parameters, and the like). The components can employ various AI-based schemes for carrying out various embodiments/examples disclosed herein. To provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine the states of the system, environment, etc., from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether the events are correlated in close temporal proximity, and whether the events and data come from one or several event and data sources. Components disclosed herein can employ various classifications (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, \ldots, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to, training data. Other directed and undirected model classification approaches include, e.g., naïve Bayes, Bayesian networks, decision trees, neural networks, fuzzy logic models, and/or probabilistic classification models, providing different patterns of independence that can be employed. Classification as used herein also includes statistical regression that is utilized to develop models of priority.

Figure 3A:
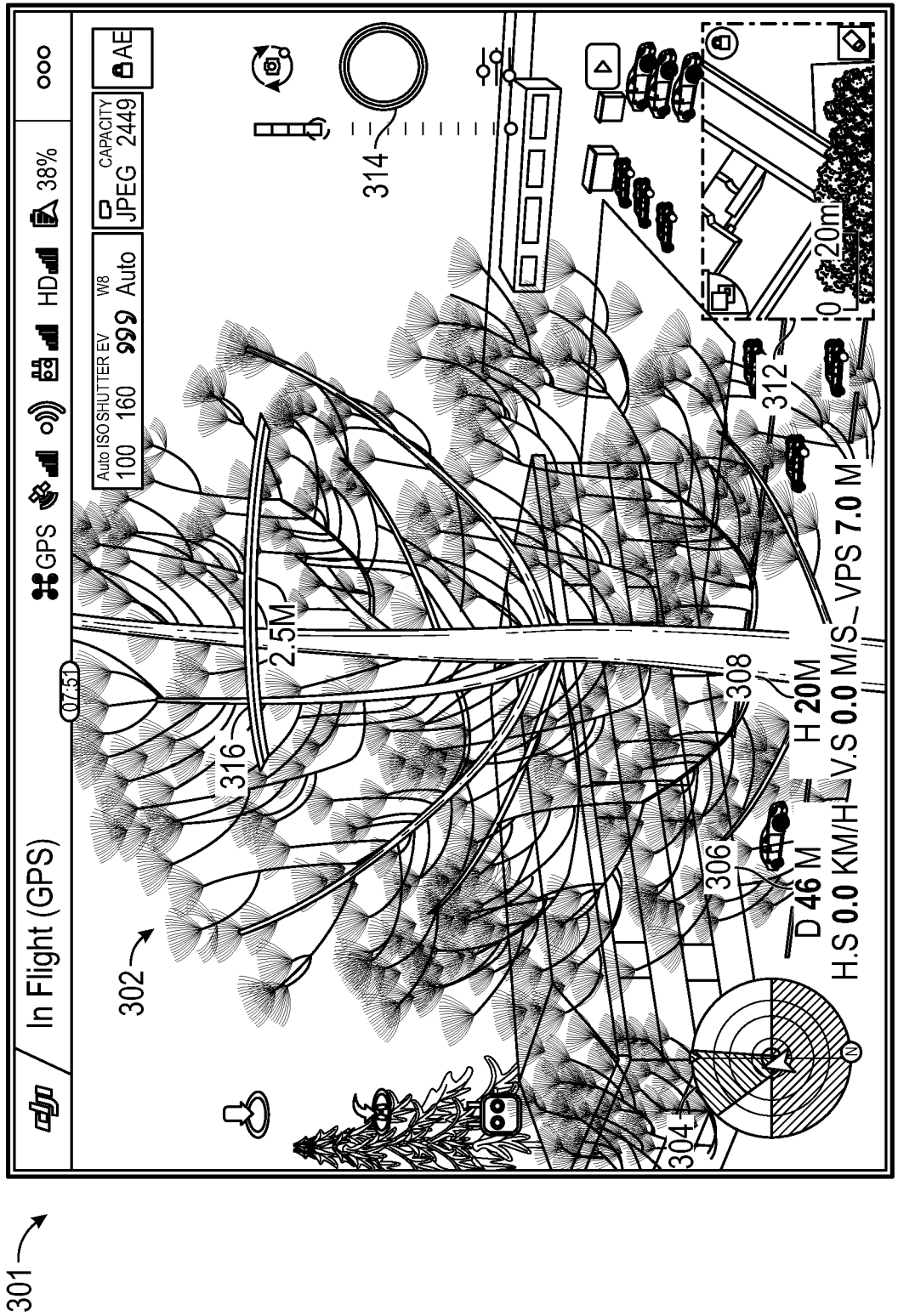
FIG. 3A shows an example visual representation of a retrieval UAV camera feed, in accordance with example embodiments of the disclosure.

FIG. 3A shows an example visual representation of a retrieval UAV camera feed, in accordance with example embodiments of the disclosure. In various embodiments, diagram 301 represents an example frame of a retrieval UAV camera feed. In another embodiment, the feed may be used by a user (e.g., a user that monitors and/or controls the retrieval UAV). For example, diagram 301 includes a view of a tree 302 in which a constrained UAV (e.g., similar to the constrained UAV 106 of FIG. 1) is trapped. In another embodiment, diagram 301 shows a compass/bearing visual 304 for determining the direction of the retrieval UAV, which may be useful for recording and controlling the movements of the retrieval UAV by the user. In one embodiment, diagram 301 further shows a distance 306 (e.g., horizontal distance) between the retrieval UAV and the constrained UAV, which may also be useful for recording and controlling the movements of the retrieval UAV by the user. In an embodiment, diagram 301 includes a visual indicating the height 308 of the retrieval UAV, for example, with respect to the ground level, which may also be useful for recording and controlling the movements of the retrieval UAV by the user.

In another embodiment, diagram 301 includes an aerial view 312 of a portion of a map where the retrieval UAV is located. For example, the aerial view 312 may be generated based on a map software module or plugin, and may superimpose the coordinates of the retrieval UAV onto a portion of a map of the environment based on the coordinates. The aerial view 312 may include different levels of zoom, which may be configured based at least in part on a user input. In another embodiment, diagram 301 may include an image/video capture control 314, which may be used, for example, by a user to take pictures and videos of what the retrieval UAV sees. This may be useful for legal liability purposes, documentation purposes, or in cases where the trapped UAV may be in a particularly vulnerable area (e.g., power lines further constrained by trees), which may need to be analyzed prior to launching projectiles. In one embodiment, diagram 301 further includes a visual indicator of a measurement distance 316, which may correspond to a predetermined length scale (e.g., 3 meters). In another embodiment, the measurement distance 316 may also be useful for recording and controlling the movements of the retrieval UAV by the user.

Figure 3B:
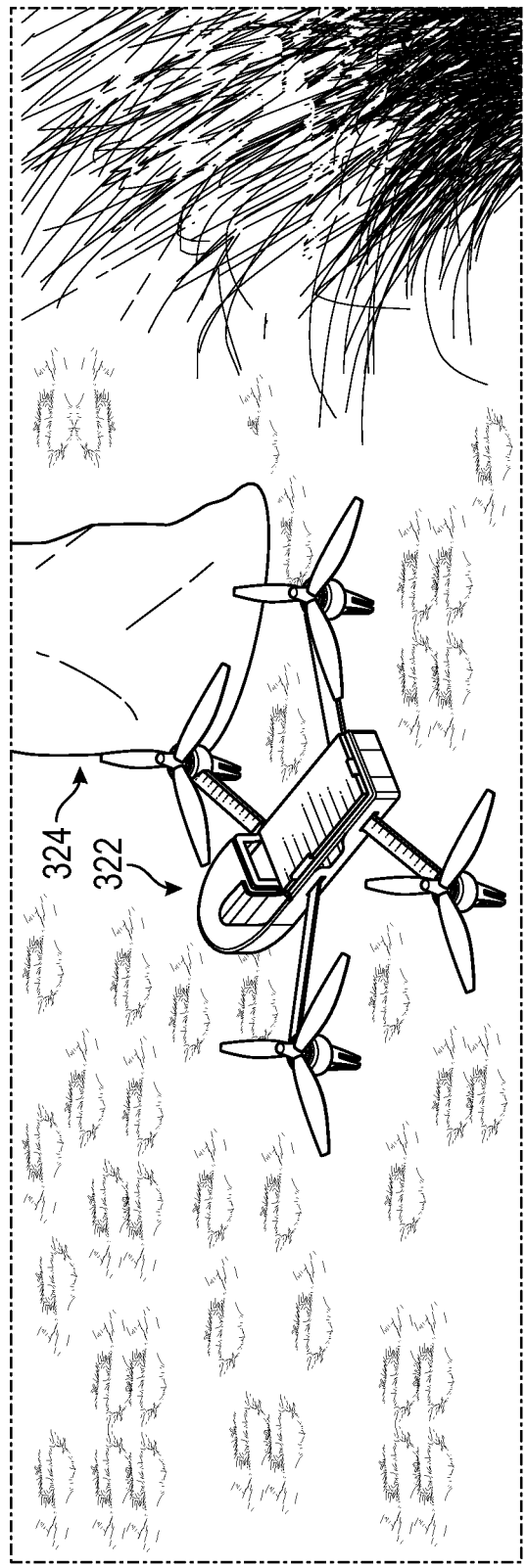
FIG. 3B shows an example retrieved UAV using the disclosed systems, methods, and apparatuses, in accordance with example embodiments of the disclosure.

FIG. 3B shows an example retrieved UAV using the disclosed systems, methods, and apparatuses, in accordance with example embodiments of the disclosure. In particular, diagram 303 shows an example retrieved UAV 322 at the bottom of a tree 324. As previously noted, the retrieved UAV 322 may have been previously lodged and trapped in a portion of the tree 324, for example, in the branches of the tree and may therefore correspond to the previous trapped UAV (e.g., the trapped UAV 106 of FIG. 1). Further, the retrieved UAV 322 may have been dislodged by the actions of the retrieval UAV (e.g., similar to the retrieval UAV 102 of FIG. 1). The retrieved UAV 322 may be dislodged from the branches of the tree 324 after a tether of the launching mechanism (e.g., the grapple) is shaken by a user or the retrieval UAV and is used to dislodge the UAV 322. Further, the retrieved UAV 322 may have hit various branches on the way down from the tree so as not to further damage the retrieved UAV 322 during impact with the ground. In another embodiment, the retrieved UAV 322 may be configured to fly at least partially during the descent from its trapped location to further mitigate the impact of a ground landing.

Figure 4:
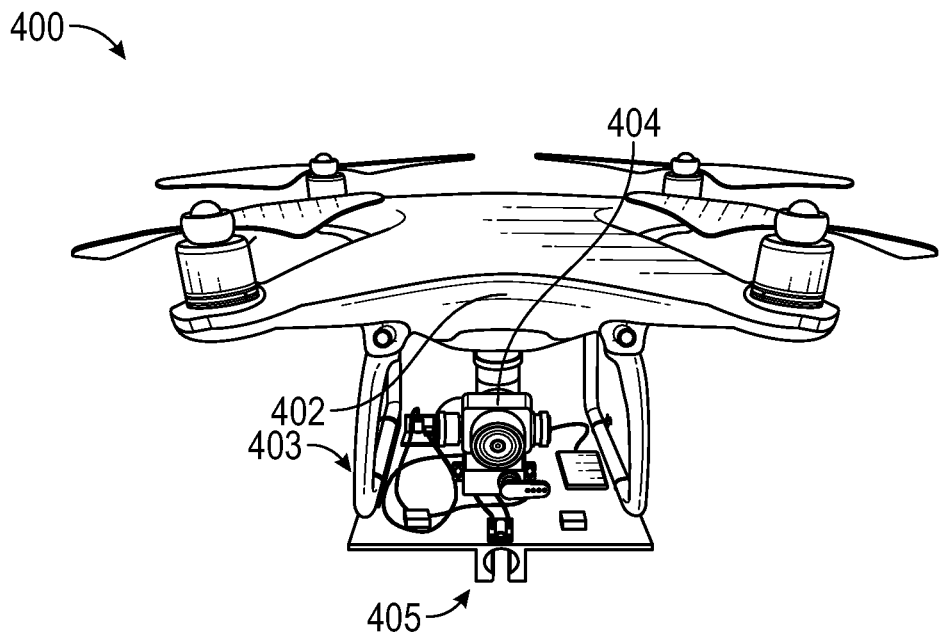
FIG. 4 shows an example front view of a retrieval UAV, in accordance with example embodiments of the disclosure.

FIG. 4 shows an example front view of a retrieval UAV, in accordance with example embodiments of the disclosure. In particular, diagram 400 shows an example front view of a retrieval UAV, including a portion of the retrieval UAV chassis 402. Further, the chassis 402 may be coupled (e.g., mechanically and/or electronically coupled) to the RLU 403 of the retrieval UAV. In other embodiments, not shown, the RLU may be mounted on another UAV that may be separate from the retrieval UAV. In various embodiments, the RLU 403 may include structures such as boards (e.g., printed circuit boards, PCBs) and plastic-based mounting structures for the integration of various devices on the RLU 403. For example, the RLU 403 may be configured to support a camera 404. The camera 404 may include any suitable imaging component having a desired resolution and peripheral optics. The camera may, for example, include a wide-aperture lens, a zooming lens, and/or the like, that may be useful in locating and analyzing the trapped UAV and the tree or other obstacle in which the trapped UAV is constrained. Further, the camera 404 may be part of a video camera that may serve to record video of the scene as shown and described in connection with FIG. 3A above. In another embodiment, the camera 404 may be a digital camera having a limited weight and spatial profile, which may be based at least in part on the size of the retrieval UAV, the clearance provided by the retrieval UAV with respect to the RLU, and/or any other relevant design characteristic. In various embodiments, diagram 400 includes a launching mechanism 405, which may be used to house a portion of the projectile or other launching device that may be shot toward a target area associated with the trapped UAV.

Figure 5:
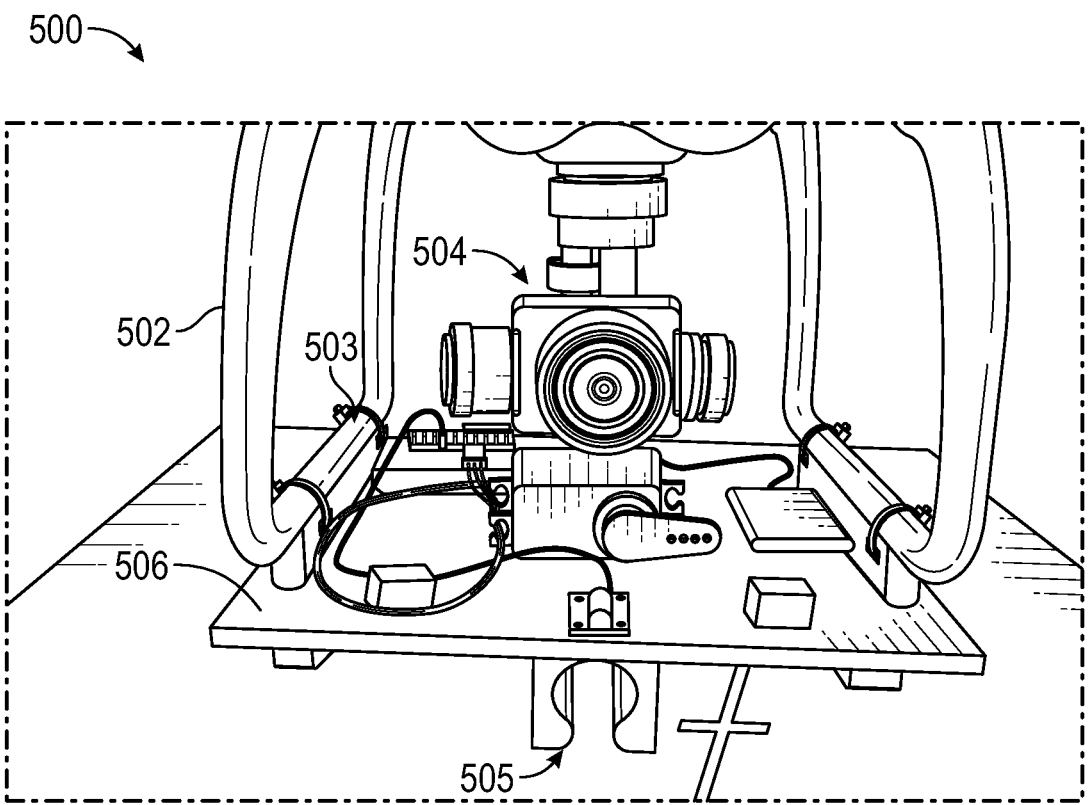
FIG. 5 shows an example close-up view of a portion of the retrieval UAV, including a camera and launching mechanism, in accordance with example embodiments of the disclosure.

FIG. 5 shows an example close-up view of a portion of the retrieval UAV, including a camera and launching mechanism, in accordance with example embodiments of the disclosure. In particular, diagram 500 shows aspects of a close-up view of a portion of the retrieval UAV, including the RLU having a mounting structure 506 including an example launching mechanism 505. In one embodiment, the RLU may include a control circuit and a power supply (see for example, FIG. 6 and related description). In another embodiment, the RLU may be mounted on a portion 502 of a UAV (e.g., an unmodified quadcopter UAV), which may serve as the retrieval UAV. In one embodiment, the RLU may be mounted on the retrieval UAV using a non-retractable landing gear on the portion 502 of the UAV, and cable ties 503 may be used to mechanically couple the RLU to the retrieval UAV. Diagram 500 further shows a camera 504, as previously shown and described. Moreover, diagram 500 shows another view of the launching mechanism 505, which, as noted, is used to couple with a projectile that may be fired at a target associated with a trapped UAV. In particular, the launching mechanism 505 is further shown and described in connection with FIG. 7, below.

Figure 6:
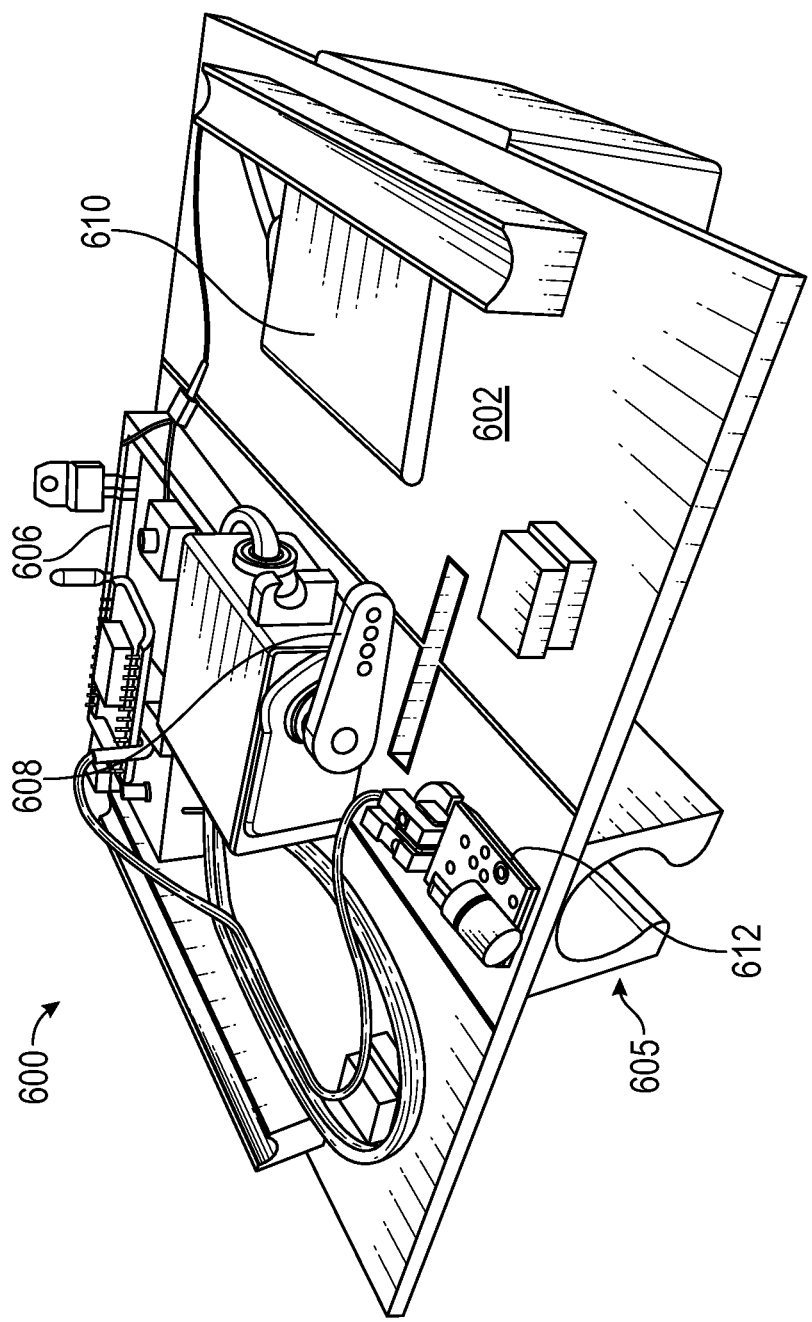
FIG. 6 shows an example perspective view of a portion of the retrieval UAV, including the camera and launching mechanism, in accordance with example embodiments of the disclosure.

FIG. 6 shows an example perspective view of a portion of the retrieval UAV, including the camera and launching mechanism, in accordance with example embodiments of the disclosure. In particular, diagram 600 of the perspective view of the RLU includes various electronic components that may be used in connection with the retrieval of a trapped UAV. In some embodiments, the RLU may include a launch platform 602, which may structurally support the various components of the RLU. Further, in an embodiment, the launch platform 602 may, in some cases, extend to the landing gear (e.g., portion 502 shown and described in connection with FIG. 5, above). Accordingly, absent additional design considerations, the RLU may interfere with the automated landing sequence sensors of an unmodified UAV. Accordingly, the RLU may replicate at least a portion of such landing sequence sensors (not shown).

In some embodiments, a spring powered launching mechanism 605 may be configured to maximize the impulse of the launch without adding considerable weight to the payload of the UAV. In one embodiment, the spring powered launching mechanism 605 may use a servo motor 608 to control the release trigger of the launching mechanism. In another embodiment, the servo motor 608 may be controlled over a wireless network (e.g., Wi-Fi, cellular, and the like), for example, via instructions from a user device (e.g., a mobile phone). Further, the launch platform 602 may include a control circuit 606 that may use a microcontroller unit (MCU, or other similar processing unit, for example, an ESP8266 MCU). As noted, the launch platform 602 may include a power unit 610. In some embodiments, the power unit 610 may power the retrieval UAV using one or more batteries, or may be wired to a power source (e.g., a ground-based power source) using a cord. In one embodiment, the control system may operate independently of the operations of the retrieval UAV (e.g., there may be two separate circuits that control the UAV flight and the RLU and associated circuits).

In one embodiment, a laser 612 (e.g., a laser pointer) may serve as a target assist laser. In particular, the laser 612 may be configured on the launch platform 602, and may serve to assist the UAV and/or the user in estimating the vertical distance from the target and/or the orientation of the UAV with respect to the target. In one embodiment, the horizontal distance may be determined using one or more ultrasonic sensors (not shown) on the RLU. In another embodiment, the ultrasonic sensors may provide a horizontal distance to the closest object in front of the retrieval UAV. Therefore, the user or control algorithms of the UAV may serve to position the retrieval UAV so that it has a direct line of sight with the target location.

Figure 7:
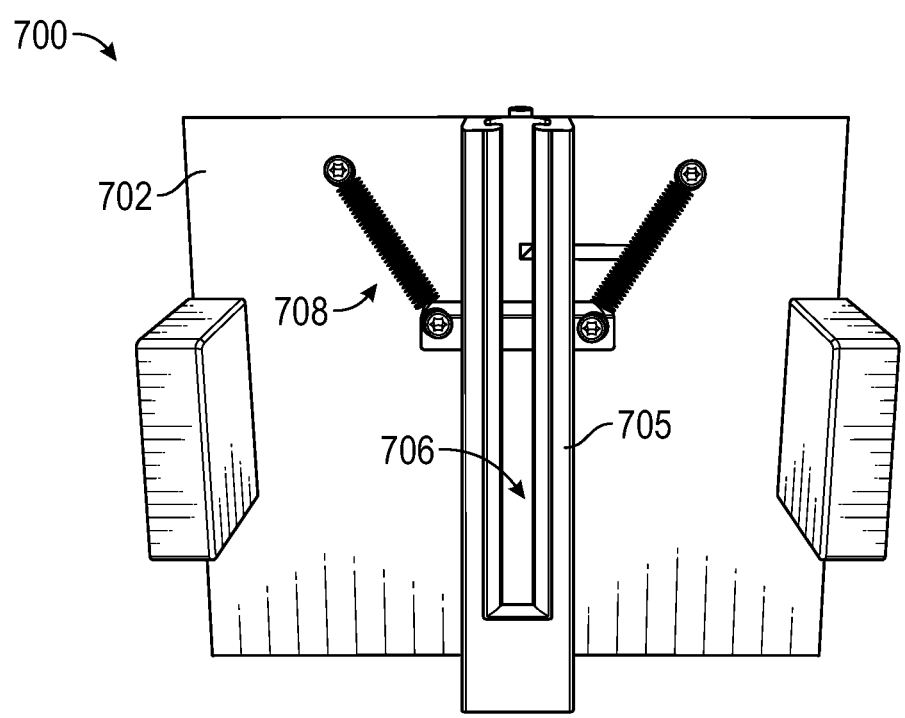
FIG. 7 shows an example bottom view of the launching mechanism, in accordance with example embodiments of the disclosure.

FIG. 7 shows an example bottom view of the launching mechanism, in accordance with example embodiments of the disclosure. In particular, diagram 700 shows a bottom view of the launching mechanism, including a bottom view of an RLU launch board 702, the launching mechanism 705, a chamber 706 for loading the launching device (e.g., a grapple), and a spring mechanism 708. In one embodiment, the launching mechanism 705 may be on the underside of the launch board 702 so as not to interfere with the operation of the retrieval UAV. In another embodiment, the launching mechanism 705 may be configured to have at least one chamber 706 as shown, where a portion of the projectile device (e.g., a shaft of the projectile device) may be loaded into and engaged with the spring mechanism 708. In another embodiment, the spring mechanism 708 can apply a level of tension to the loaded projectile device, the level of tension based at least in part on the weight of the projectile device.

Figure 8:
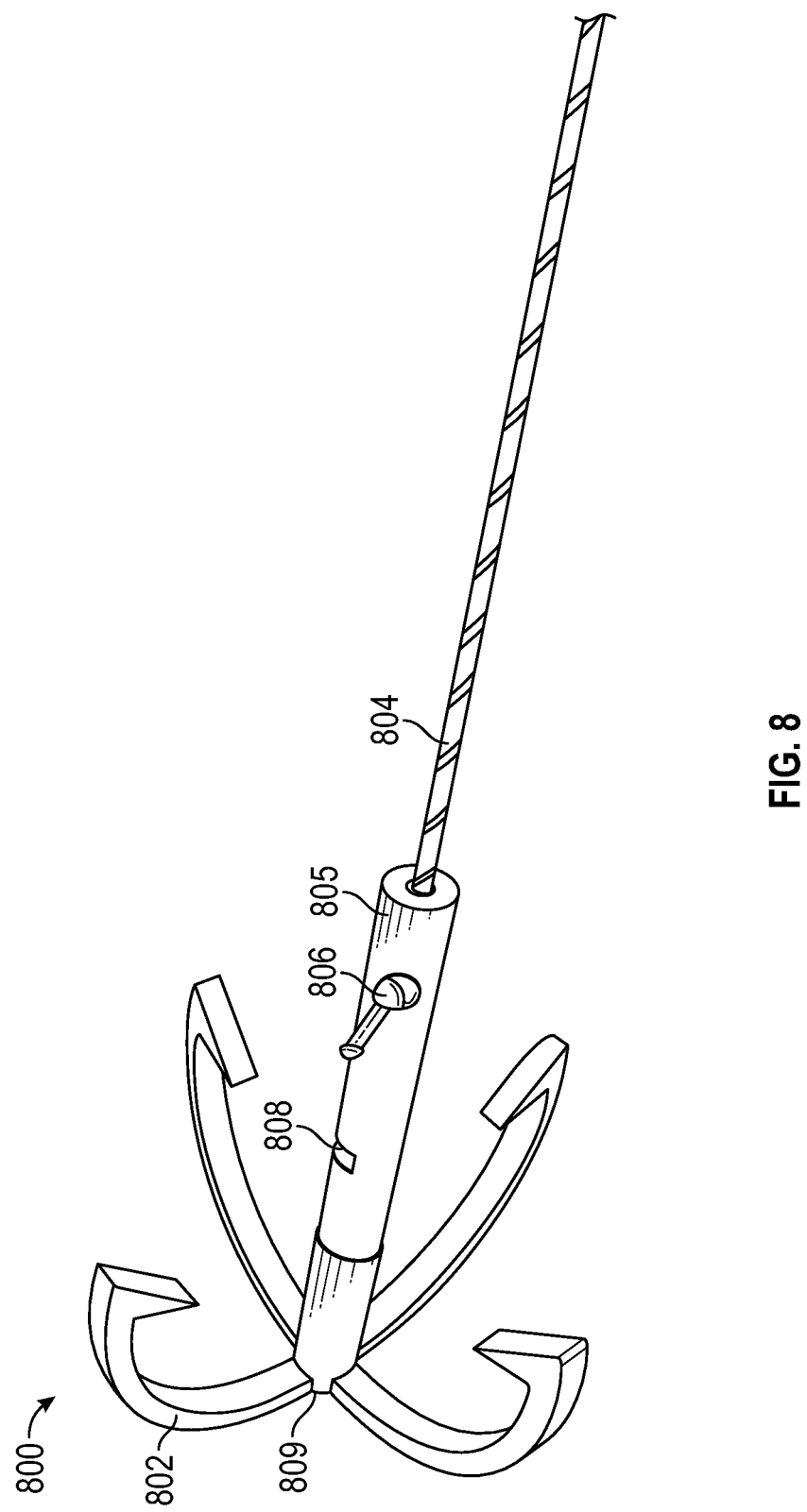
FIG. 8 shows an example perspective view of the bottom view of the retrieval mechanism (e.g., a grapple), in accordance with example embodiments of the disclosure.

FIG. 8 shows an example perspective view of the bottom view of the retrieval mechanism (e.g., a grapple), in accordance with example embodiments of the disclosure. In some embodiments, the more articulated (e.g., spatially differentiated) a UAV-mounted retrieval device is (e.g., a grasping device configured to lodge into a portion of a tree or other obstacle), the more complex it may be to compensate for weight changes and center of mass changes of the retrieval UAV during flight and during operation. In another embodiment, for less articulated UAV mounted grasping devices, the UAV may need to be able to precisely position itself in flight. In various embodiments, for both cases (e.g., the more articulated UAV-mounted grasping device and the less articulated UAV-mounted grasping device), the flight control capabilities of the UAV (e.g., using various models and artificial intelligence (AI)-based algorithms) may be used to compensate for such flight and operational irregularities. However, such configuration of the flight control capabilities of a UAV may not necessarily be an option in some cases, such as when using an off-the-shelf UAV.

In another embodiment, diagram 800 shows a launching device that may include a grappling hook 802. In some embodiments, the grappling hook 802 may be connected to a base shaft 805 portion of the launching device, which may serve as a projectile. In one embodiment, the launching device may serve as a modular device, with a base shaft 805 that may be configured to couple with various geometries of an RLU (e.g., the chamber 706 of the launch board of FIG. 7). In another embodiment, the base shaft 805 may be installed and pushed onto the spring powered launching mechanism (e.g., the launching mechanism 705 of FIG. 7) and may be held in place by the servo motor (e.g., the servo motor 608 of FIG. 6). Further, in another aspect, the servo motor may have an arm that is configured to lock into a slot 808 situated on the base shaft 805 until a control circuit (e.g., the control circuit 606 of FIG. 6) is configured to release the grappling hook 802. A hole 806 at the end of the base shaft 805 may allow a tether 804 (e.g., a rope, a cable, etc., such as a 5 mm diameter rope) to be attached to the grappling hook 802. In another embodiment, the tether 804 may be secured to the base shaft 805 using a knot in the tether 804.

As noted, in one embodiment, the grappling hook 802 may be configured to get lodged in the foliage (e.g., branches and leaves) of a large tree. In another embodiment, the grappling hook 802 may include four hook members that may be arranged perpendicular to each other along the axes of the forward motion of the grappling hook. In another embodiment, a breakpoint 809 may be included for each hook of the grappling hook 802 near the base shaft 805. The position of the breakpoint 809 may be chosen such that a strong moment force in the direction opposite to projectile motion may serve to remove the hooks from the base shaft 805. Such a mechanism may enable relatively easy retrieval of the base shaft 805 and/or the tether 804 in the event the launching device gets stuck in the tree. Other tools and devices may be mounted onto the base shaft including active beacons (not shown), assisted landing anchors and/or smaller fixed-wing UAVs. In some embodiments, the hook members of the grappling hook 802 may be replaceable.

Figure 9:
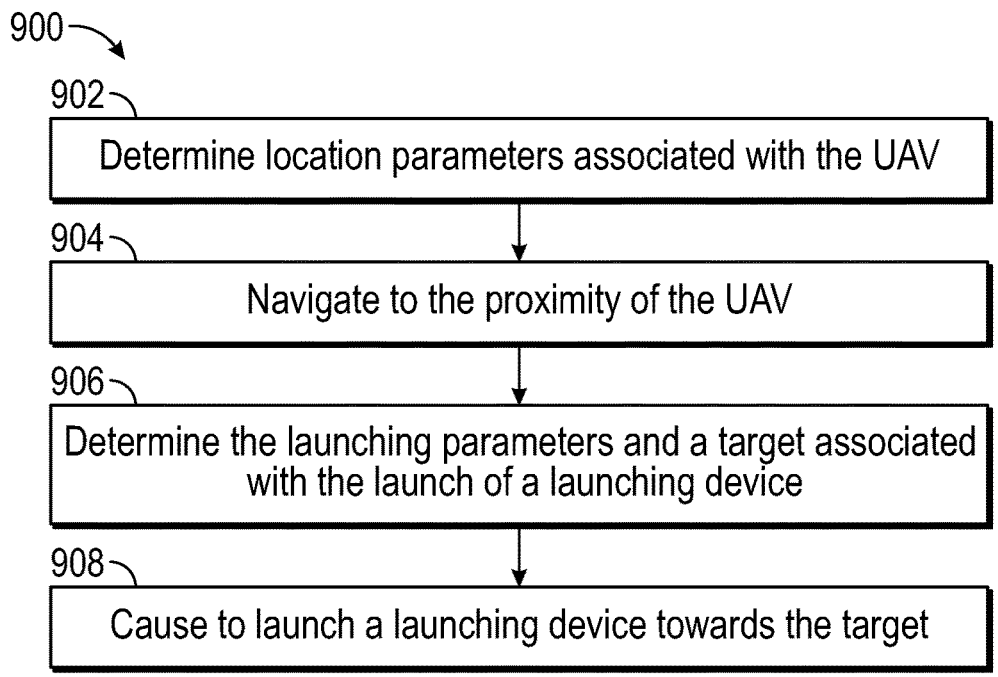
FIG. 9 shows a diagram of an example flow for aspects of the operation of UAV retrieval, in accordance with example embodiments of the disclosure.

FIG. 9 shows a diagram of an example flow for aspects of the operation of UAV retrieval, in accordance with example embodiments of the disclosure.

At block 902, location parameters associated with the first UAV may be determined. In various embodiments, the location parameters may be received by the retrieval UAV from direct communications (e.g., wireless communications) between the UAV and the retrieval UAV. In another embodiment, the location parameters may be determined from communication with a third-party server that is in communication with the UAV. In another embodiment, the location parameters may be provided by a user, or may be automatically provided by a user device (e.g., a mobile phone) in proximity of the UAV. In various embodiments, the location may be provided by a GPS system in communication with the chip set of the UAV and/or the retrieval UAV, optionally in combination with third-party servers.

At block 904, the flow may include navigating to the proximity of the UAV. In various embodiments, the navigation may be performed in accordance with a predetermined route, that may be generated by processors of the retrieval UAV and/or third-party servers. In another embodiment, the proximity of the UAV may include a predetermined distance from the first UAV, for example, about 3 meters to about 30 meters from the coordinates of the first UAV. In another embodiment, the retrieval UAV may first navigate to a first position that is at a first proximity of the first UAV, make further measurements of the UAV (e.g., using one or more sensors such as ultrasound sensors, GPS sensors, camera sensors, etc.) and/or receive one or more user inputs (e.g., user remote control inputs received from a user device running a corresponding navigation application), and then the retrieval UAV navigates to a second position that is in closer proximity of the first UAV. In another embodiment, the retrieval UAV may get within a predetermined altitude of the first UAV.

At block 906, the launching parameters and a target associated with the launch of a launching device may be determined. In various embodiments, the launching parameters may be determined by numerous factors, individually or in combination, such as the vertical and horizontal distance of the retrieval UAV from the first UAV, the position and/or orientation of the first UAV in an obstacle such as a tree, the weather conditions (e.g., wind, rain, etc.), the mass of the launching device (e.g., projectile) to be launched at the target, the type of branches, the type of tree, the size of the retrieval UAV and the size and/or mass of the first UAV, combinations thereof, and/or the like. In various embodiments, the launching parameters may be determined by any suitable computer algorithm, including, but not limited to, machine learning algorithms that are determined from data related to UAV retrieval operations and collected historically.

At block 908, the flow may include causing to launch a launching device towards the target. In various embodiments, computer instructions may be provided to a control circuit of the retrieval UAV, which may be configured to cause a launching trigger to be released. In another embodiment, there may be a tether associated with the launching device, and a handle of the tether may be dropped towards the ground such that a user may tug on the tether to shake the branches proximate to the projectile target location and thereby dislodge the trapped UAV.

Figure 10:
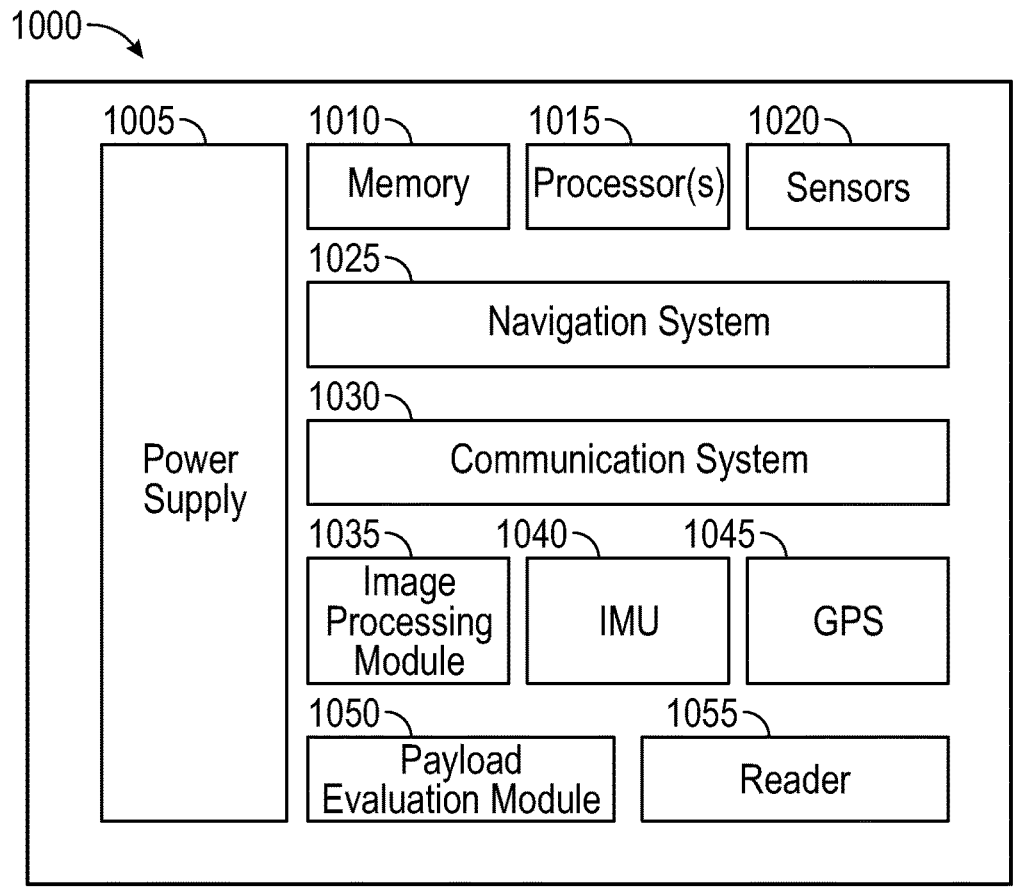
FIG. 10 illustrates a set of components that may be associated with a UAV, according to various embodiments of the disclosure.

FIG. 10 represents a diagram showing a set of components associated with a UAV, according to various embodiments of the disclosure. In particular, the UAV may include the retrieval UAV and/or the trapped UAV. In particular, the UAV or drone may include a power supply 1005 (e.g., a battery), a memory 1010 (e.g., volatile memory and/or non-volatile memory), processor(s) 1015 for executing instructions and performing calculations, sensors 1020, a navigation system 1025, a communication system 1030, an image processing module 1035, an inertial measurement unit (IMU) 1040, a global positioning system (GPS) 1045, a payload evaluation module 1050, and a fingerprint reader 1055.

In one embodiment, the communication system 1030 may also include one or more communication interfaces for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the communication system 1030 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Zigbee, Bluetooth protocols, wireless universal serial bus (USB) protocols, and/or any other wireless protocol.

The processor(s) 1015 are the main processors of a drone which may include application processors, various coprocessors, and other dedicated processors for operating a drone. The processor(s) 1015 may be communicably coupled with memory 1010 and configured to run the operating system, the user interfaces, the sensors 1020, the navigation system 1025, the communication system 1030, the image processing module 1035, and/or other components. In some embodiments, the processor(s) 1015 may include multiple dedicated or shared processors configured to perform signal processing (e.g., baseband processors for cellular communications), implement/manage real-time radio transmission operations of the drone, and make navigation decisions (e.g., compute flight paths, implement obstacle avoidance routines, etc.). These processors along with the other components may be powered by the power supply 1005. The volatile and non-volatile memories found in various embodiments may include storage media for storing information such as processor-readable instructions, data structures, program modules, or other data. Some examples of information that may be stored include basic input/output systems (BIOS), operating systems, and applications.

The sensors 1020 may be used to detect events or changes in the surrounding environment and produce a corresponding signal that can be acted upon by various components within the UAV or transmitted to other parts of the UAV infrastructure. In some embodiments, the sensors 1020 may include one or more of the following: a microphone, a camera, a thermostat, an accelerometer, light sensors, motion sensors, moisture sensors, fingerprint readers, retinal scanners, chemical sensors, scales, LIDAR, RADAR, and the like. Several of these sensors, for example, may be used as part of the navigation system 1025. As another example, battery life can vary significantly based on temperature. As such, the temperature reading from the thermostat may be used to more accurately predict the range of the drone. In some embodiments, the signal generated by the microphone can be used to determine the noise level of the surrounding environment and to record a voice message or identification from a user.

The navigation system 1025 can be responsible for determining the flight path of a drone. In some embodiments, high-level instructions or pick-up/drop-off destinations can be communicated to the drone via the communication system 1030. The navigation system 1025 may receive inputs from the multiple sensors 1020 (e.g., accelerometers, gyroscopes, LIDAR, RADAR, etc.), the image processing module 1035, the inertial measurement unit (IMU) 1040, and/or the GPS 1045 to determine optimal flight paths, detect and avoid objects, coordinate with other nearby drones using the communication system 1030, and the like. For example, the IMU 1040 can determine the UAV's orientation and velocity, and may determine the launching parameters associated with the launching device.

According to one embodiment, the navigation system 1025 may include location determining aspects, devices, modules, functionalities, and/or similar words used herein interchangeably. For example, the navigation system 1025 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the drone's position in connection with a variety of other systems, including cellular towers, Wi-Fi access points, and/or the like. Similarly, the navigation system 1025 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (for example smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

As noted, FIG. 10 illustrates a set of components within a UAV. In another aspect, the drone may include a payload evaluation module 1050 that can use input from the sensors 1020, the image processing module 1035, and/or the fingerprint reader 1055 to determine whether to deliver the payload (e.g., the projectile) to the target. For example, the payload evaluation module 1050 may request user authentication via the fingerprint reader 1055 (e.g., a fingerprint reader) and/or another biometric reader, prior to going on a retrieval mission (e.g., after being loaded with the launching device). If the reading does not match the record on file (e.g., from an initial registration with the UAV system or other third-party servers), then the payload evaluation module 1050 may determine to not launch the launching device. As another example, a scale may be used to measure the weight of the launching device. If the payload evaluation module 1050 determines that the launching device exceeds a maximum weight for the UAV, then the launching device may not be used.

In various embodiments, the payload evaluation module 1050 may use the image processing module 1035 to identify the size and/or type of launching device, and verify the identity of a launching device, various types of chemical sensors to detect possible explosives, barcode readers to identify an originator/packer, as well as others. In some embodiments, the UAVs may also include a display (e.g., a liquid crystal display) or interface with a mobile device (e.g., via a personal area network, Bluetooth, a cellular network, etc.) to confirm with the user that no hazardous launching devices (e.g., listed on the display) are included in the operation. If no confirmation is received, the payload evaluation module 1050 may refuse the operation.

Figure 11:
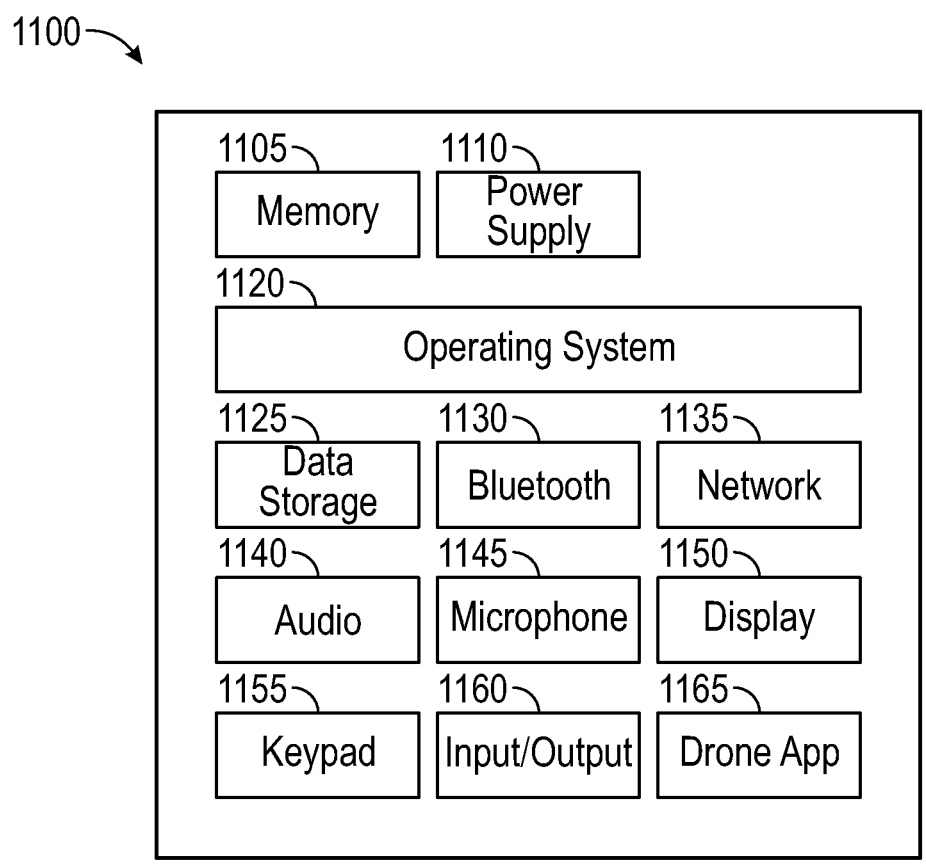
FIG. 11 illustrates a set of components within a mobile device with a drone application according to various embodiments of the disclosure.

FIG. 11 illustrates a set of components within a mobile device with a drone application according to various embodiments of the disclosure. The mobile device 1100 may include a drone application 1165 that may be used in connection with a management component of a UAV to configure aspects of the UAVs described above. As shown in FIG. 11, the mobile device 1100 may include a memory 1105 (e.g., volatile memory and/or non-volatile memory), a power supply 1110 (e.g., battery), processor(s) (not shown) for executing processing instructions, and an operating system 1120. Additional components such as a data storage component 1125 (e.g., hard drive, flash memory, memory card, etc.), one or more network interfaces (e.g., a Bluetooth interface 1130, and a network communication interface 1135, which enables the mobile phone to communicate by transmitting and receiving wireless signals using licensed, semi-licensed or unlicensed spectra over a telecommunications network), an audio interface 1140, a microphone 1145, a display 1150, a keypad or keyboard 1155, and other input and/or output interfaces 1160 (e.g., a fingerprint reader or other biometric sensor/security feature). The various components of a mobile device may be interconnected via a bus.

Processor(s) (not shown) are the main processors of the mobile device 1100, and they may include application processors, baseband processors, various coprocessors, and other dedicated processors for operating the mobile device 1100. For example, an application processor can provide the processing power to support software applications, memory management, graphics processing, and multimedia. An application processor may be communicably coupled with the memory 1105 and configured to run the operating system, the user interface, and the applications stored on the memory 1105 or the data storage component 1125. A baseband processor may be configured to perform signal processing and implement/manage real-time radio transmission operations of the mobile device 1100. These processors along with the other components may be powered by the power supply 1110. The volatile and non-volatile memories found in various embodiments may include storage media for storing information such as processor-readable instructions, data structures, program modules, or other data. Some examples of information that may be stored include basic input/output systems (BIOS), operating systems, and applications.

In accordance with some embodiments, the drone application 1165 may be installed on the mobile device 1100. The drone application 1165 may be used to register a user, confirm retrieval operations, convey the current location of a trapped UAV or retrieval UAV, provide real-time videos or images from a retrieval UAV, and the like.

In some example operational scenarios, the drone application 1165 may be configured to receive a signal from a user device (e.g., a mobile phone) indicative of a retrieval operation. The drone application 1165 may determine, using the network 1135 in combination with one or more processors (not shown), a location of the user device and/or trapped UAV and a corresponding route to navigate to a proximity of the trapped UAV. In particular, the drone application 1165 may already have scheduled previous retrieval operations to additional users, and may therefore need to schedule the current retrieval operation request along a partially determined route, which may need to be updated accordingly using any suitable technique (e.g., an AI-based algorithm for route optimization). In one embodiment, the drone application 1165 may send a message to the user device indicative of a time and a location for the retrieval operations.

One or more operations of the methods, process flows, and use cases of FIGS. 1-11 may be performed by one or more engines, program module(s), applications, or the like executable on an electronic device. It should be appreciated, however, that such operations may be implemented in connection with numerous other device configurations.

The operations described and depicted in the illustrative methods and process flows of FIGS. 1-11 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-11 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component.

Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Example embodiments of the disclosure may include one or more of the following examples:

Example 1 may include a device, comprising: a camera configured to take one or more images of at least a target site associated with an unmanned aerial vehicle (UAV); a control circuit coupled to a launching mechanism, the launching mechanism configured to launch a launching device towards a target; at least one memory that stores computer-executable instructions; and at least one processor of the one or more processors configured to access the at least one memory wherein the at least one processor of the one or more processors is configured to execute the computer-executable instructions to: determine, via the at least one processor, launching parameters and a target associated with the launch of a launching device; receive, via the at least one processor, instructions to launch the launching device; and cause, via the control circuit, the launch of a launching device towards the target.

Example 2 may include the device of example 1, wherein the device is mechanically coupled to a portion of a second UAV.

Example 3 may include the device of example 1 and/or some other example herein, wherein the launching device comprises a projectile.

Example 4 may include the device of example 1 and/or some other example herein, wherein the launching device comprises a grapple.

Example 5 may include the device of example 1 and/or some other example herein, wherein the launching device includes a tether.

Example 6 may include the device of example 1 and/or some other example herein, wherein the launching device comprises a hooking member comprising at least one hook.

Example 7 may include the device of example 6 and/or some other example herein, wherein the hooking member is removable from the launching device.

Example 8 may include the device of example 1 and/or some other example herein, further comprising a spring member configured to launch the launching device.

Example 9 may include the device of example 1 and/or some other example herein, further comprising a power unit, the power unit configured to provide power to the device.

Example 10 may include the device of example 1 and/or some other example herein, further comprising a laser that illuminates an area associated with the target.

Example 11 may include the device of example 1 and/or some other example herein, wherein the launching parameters are based at least in part on a horizontal distance between the launching device and the target and a vertical distance between the launching device and the target.

Example 12 a method, comprising: determining location parameters associated with an unmanned aerial vehicle (UAV); navigating to the proximity of the UAV; determining launching parameters and a target associated with the launch of a launching device; and causing the launch of a launching device towards the target.

Example 13 may include the method of example 12, wherein determining the location parameters associated with the UAV includes at least one of receiving location parameters from the UAV or receiving location parameters from a user.

Example 14 may include the method of example 12 and/or some other example herein, wherein determining launching parameters and the target is based at least in part on one or more images of the target.

Example 15 may include the method of example 12 and/or some other example herein, wherein determining the launching parameters is based at least in part on determining a horizontal distance between the launching device and the target or determining a vertical distance between the launching device and the target.

Example 16 may include the method of example 12 and/or some other example herein, wherein causing the launch of a launching device comprises transmitting instructions to a control circuit coupled to a launching mechanism.

Example 17 may include a non-transitory computer-readable medium storing computer-executable instructions which, when executed by a processor, cause the processor to perform operations comprising: determining location parameters associated with an unmanned aerial vehicle (UAV); navigating to the proximity of the UAV; determining launching parameters and a target associated with the launch of a launching device; and causing the launch of a launching device towards the target.

Example 18 may include the non-transitory computer-readable medium of example 17, wherein the computer-executable instructions to determine the location parameters associated with the UAV include computer-executable instructions to receive location parameters from the UAV or receive location parameters from a user.

Example 19 may include the non-transitory computer-readable medium of example 17 and/or some other example herein, wherein the computer-executable instructions to determine launching parameters include computer-executable instructions to determine a horizontal distance between the launching device and the target or determine a vertical distance between the launching device and the target.

Example 20 may include the non-transitory computer-readable medium of example 17 and/or some other example herein, wherein the computer-executable instructions that cause the launch of a launching device comprise computer-executable instructions to transmit instructions to a control circuit coupled to a launching mechanism.

What is claimed is:

1. A device, comprising:
    a camera associated with a first unmanned aerial vehicle (UAV) configured to take one or more images of a second UAV that is trapped in a first above ground location;
    a control circuit coupled to a launching mechanism of the first UAV, the launching mechanism configured to launch a launching device of the first UAV towards the second UAV;
    at least one memory that stores computer-executable instructions; and
    at least one processor of the one or more processors configured to access the at least one memory wherein the at least one processor of the one or more processors is configured to execute the computer-executable instructions to:
        identify, based on the one or more images, the second UAV that is trapped in the first above ground location;
        determine, via the at least one processor, launching parameters associated with the launch of the launching device, wherein determining the launching parameters comprises:
        determine, based on the one or more images, a second location from which to launch the launching device from the first UAV, wherein determining the second location comprises determining a horizontal distance between the first UAV and the second UAV and determining an altitude of the first UAV, wherein the horizontal distance and the altitude are determined such that a curved projection path of the launching device will include the second location;
        receive, by the first UAV via the at least one processor, instructions to launch the launching device from the second location; and
        cause, via the control circuit, the launch of the launching device from the first UAV at the second location and towards the second UAV at the first above ground location.

2. The device of claim 1, wherein the device is mechanically coupled to a portion of the first UAV.

3. The device of claim 1, wherein the launching device comprises a projectile.

4. The device of claim 1, wherein the launching device comprises a grapple or a hooking member comprising at least one hook.

5. The device of claim 1, wherein the launching device includes a tether.

6. The device of claim 4, wherein the hooking member is removable from the launching device.

7. The device of claim 1, further comprising a spring member configured to launch the launching device.

8. The device of claim 1, further comprising a power unit, the power unit configured to provide power to the device.

9. The device of claim 1, further comprising a laser that illuminates an area associated with the second UAV.

10. The device of claim 1, wherein the launching parameters are based at least in part on a horizontal distance between the launching device and the second UAV and a vertical distance between the launching device and the second UAV.

11. A method, comprising:
    identifying, based on one or more images captured by a camera of a first UAV, that a second UAV that is trapped in a first above ground location;
    determining location parameters associated with a launch of a launching device of the first UAV;
    navigating to a proximity of the first UAV;

determining launching parameters and a target associated with the launch of the launching device from the first UAV, wherein determining the launching parameters comprises:
  determining, based on the one or more images, a second location from which to launch the launching device from the first UAV, wherein determining the second location comprises determining a horizontal distance between the first UAV and the second UAV and determining an altitude of the first UAV, wherein the horizontal distance and the altitude are determined such that a curved projection path of the launching device will include the second location; and
  causing the launch of the launching device from the first UAV at the second location and towards the second UAV at the first above ground location.

12. The method of claim 11, wherein determining the launching parameters associated with the second UAV includes at least one of receiving location parameters from the first UAV or receiving the location parameters from a user.

13. The method of claim 11, wherein determining the launching parameters and the target is based at least in part on one or more images of the target.

14. The method of claim 11, wherein determining the launching parameters is based at least in part on determining a horizontal distance between the launching device and the target or determining a vertical distance between the launching device and the target.

15. The method of claim 11, wherein causing the launch of the launching device is based on wirelessly receiving, from a second device, instructions to a control circuit coupled to a launching mechanism.

16. A non-transitory computer-readable medium storing computer-executable instructions which, when executed by a processor, cause the processor to perform operations comprising:
  identifying, based on one or more images captured by a camera of a first UAV, that a second UAV that is trapped in a first above ground location;
  determining location parameters associated with a launch of a launching device of the first UAV;
  navigating to a proximity of the first UAV;
  determining launching parameters and a target associated with the launch of the launching device from the first UAV, wherein determining the launching parameters comprises:
    determining, based on the one or more images, a second location from which to launch the launching device from the first UAV, wherein determining the second location comprises determining a horizontal distance between the first UAV and the second UAV and determining an altitude of the first UAV, wherein the horizontal distance and the altitude are determined such that a curved projection path of the launching device will include the second location; and
    causing the launch of the launching device from the first UAV at the second location and towards the second UAV at the first above ground location.

17. The non-transitory computer-readable medium of claim 16, wherein the computer-executable instructions to determine the launching parameters associated with the second UAV include computer-executable instructions to receive location parameters from the first UAV or receive the location parameters from a user.

18. The non-transitory computer-readable medium of claim 16, wherein the computer-executable instructions to determine the launching parameters include computer-executable instructions to determine a horizontal distance between the launching device and the target or determine a vertical distance between the launching device and the target.

19. The device of claim 1, wherein the at least one processor is further configured to execute the computer-executable instructions to:
  cause, via the control circuit, the launch of the launching device from the first UAV at the second location and towards the an object at a third location proximate to the second UAV.

20. The device of claim 1, wherein the launching mechanism and launching device are located on a launch platform that is removably affixed to landing gear of the first UAV.

* * * * *